United States Patent
Lee et al.

(10) Patent No.: US 11,296,495 B2
(45) Date of Patent: Apr. 5, 2022

(54) SURGE PROTECTION CIRCUIT AND DISHWASHER INCLUDING THE SAME

(71) Applicant: LG Electronics Inc., Seoul (KR)

(72) Inventors: Soongkeun Lee, Seoul (KR); Gwigeun Park, Seoul (KR); Wonwoo Lee, Seoul (KR); Wonjae Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 111 days.

(21) Appl. No.: 16/900,032

(22) Filed: Jun. 12, 2020

(65) Prior Publication Data
US 2020/0395749 A1 Dec. 17, 2020

(30) Foreign Application Priority Data
Jun. 14, 2019 (KR) .................. 10-2019-0070908

(51) Int. Cl.
*H02H 7/20* (2006.01)
*H02M 5/458* (2006.01)

(52) U.S. Cl.
CPC .............. *H02H 7/20* (2013.01); *H02M 5/458* (2013.01)

(58) Field of Classification Search
CPC .. H02H 7/20; H02H 7/09; H02H 7/10; H02H 7/12; H02H 7/1222; H02H 7/1252; H02H 9/04; H02H 9/042; H02H 9/043; H02H 9/046; H02M 7/02; H02M 7/04; H02M 7/05; H02M 5/458; H02M 5/46; H02M 5/48

See application file for complete search history.

(56) References Cited

U.S. PATENT DOCUMENTS

| | | | |
|---|---|---|---|
| 4,843,515 A * | 6/1989 | Richman | G01R 31/00 324/509 |
| 6,949,906 B2 | 9/2005 | Boscolo et al. | |
| 2003/0007375 A1 | 1/2003 | Boscolo et al. | |
| 2006/0056127 A1* | 3/2006 | Lewis | H02H 9/005 361/118 |
| 2011/0164339 A1 | 7/2011 | Schmid et al. | |
| 2012/0026639 A1* | 2/2012 | Wright | H02H 9/041 361/118 |
| 2015/0003125 A1 | 1/2015 | Lee et al. | |

OTHER PUBLICATIONS

EP Extended European Search Report in European Appln. No. 20179605.9, dated Nov. 12, 2020, 8 pages.

* cited by examiner

*Primary Examiner* — Nguyen Tran
(74) *Attorney, Agent, or Firm* — Fish & Richardson P.C.

(57) ABSTRACT

A surge protection circuit includes: a power supply unit configured to supply first power, a filter unit configured to filter noise of the first power while a current corresponding to a surge flows through the filter unit, a motor unit provided with at least one motor, a control unit configured to control the motor unit according to an operation mode, and a rectification unit provided with at least one protection capacitor and configured to rectify the filtered first power into second power. The filter unit is connected with a ground to thereby apply the current to the filter unit through the ground. A first impedance is generated by the filter unit and the rectification unit and a second impedance is generated by the control unit and the motor unit and a value of the first impedance is less than a value of the second impedance.

20 Claims, 2 Drawing Sheets

SURGE PROTECTION CIRCUIT AND DISHWASHER INCLUDING THE SAME

CROSS-REFERENCE TO RELATED APPLICATION

Pursuant to 35 U.S.C. § 119(a), this application claims the benefit of the earlier filing date and the right of priority to Korean Patent Application No. 10-2019-0070908, filed on Jun. 14, 2019, the contents of which is incorporated by reference herein in its entirety.

BACKGROUND

1. Technical Field

The present disclosure relates to a surge protection circuit and a dishwasher including the same, and one particular implementation relates to a surge protection circuit for protecting an electronic device from a surge, and a dishwasher including the same.

2. Description of the Related Art

In general, an Intelligent Power Module (IPM) is a module in which power semiconductor devices such as IGBT, MOSFET, and FRD, a control circuit, a drive circuit, a protection circuit, and a control power source are integrated into a single package, and is diversified in terms of input/output voltage and current, control method, shape, and size depending on use and/or requirements.

Recently, an IPM with embedded IGBT, MOSFET and dedicated IC is mainly used in an electronic device including a motor. This does not mean that such control circuit and the like are not merely mounted in one module, but an optimal design comprehensively considering systems, devices, and control and protection functions is required.

On the other hand, noise, surge, over-voltage or over-current is applied to the electronic device due to various external factors. This causes a problem of damaging the IPM and the motor.

In the related art, in order to protect a motor from a surge, the motor is designed to have predetermined distances set between a motor cover and internal three-phase AC power lines. However, such a design has a problem of increasing a volume and a manufacturing cost of the motor.

In the related art, in order to protect the motor from the surge, a logic circuit is further provided in a motor drive circuit. With this configuration, a warning signal is generated through feedback of a current detection circuit or through detection of a voltage of a power supply end using a Zener diode. The logic circuit is implemented as an operation short circuit or a high impedance according to the warning signal, so as to prevent generation of a surge voltage in a power supply line.

However, such an additional logic circuit causes a problem of increasing a production cost and occupying a volume of a product.
(Patent Literature 1) U.S. Pat. No. 6,949,906 b2

SUMMARY

The present disclosure is directed to overcoming those problems, namely, one aspect of an implementation is to protect an electronic device from an external surge.

Another aspect of the present disclosure is to protect an electronic device from a surge without considering a volume of a motor and a manufacturing cost.

The aspects to achieve in this disclosure are not limited to those aspects mentioned above, and other non-mentioned technical problems to be solved in this disclosure can be clearly understood by those skilled in the art by the following description.

In order to achieve these and other advantages and in accordance with the purpose of this specification, as embodied and broadly described herein, there is provided a surge protection circuit, which may include a power supply unit to which first power is applied, a filter unit configured to filter noise of the first power while a current corresponding to a surge flows therethrough, a motor unit provided with at least one motor controlled by a control unit according to an operation mode, and a rectification unit provided with at least one protection capacitor, and configured to rectify the first power into second power. The filter unit may be connected with a ground so that the current is applied to the filter unit through the ground. A first impedance may be generated by the filter unit and the rectification unit and a second impedance may be generated by the control unit and the motor unit. A value of the first impedance may be smaller than a value of the second impedance.

In one implementation, the first power of the surge protection circuit may be alternating current (AC) power applied through a live terminal and a neutral terminal. The filter unit may be provided with a first capacitor and a second capacitor connected between the live terminal and the neutral terminal. The rectification unit may be provided with a third capacitor, a fourth capacitor, and a fifth capacitor connected between the live terminal and the neutral terminal. The current corresponding to the surge may flow along a path configured by the ground and the first to fifth capacitors.

In one implementation, the ground of the surge protection circuit may be connected to a node between the first capacitor and the second capacitor.

In one implementation, the control unit of the surge protection circuit may be configured to generate driving power using the second power according to an operation mode, and the motor unit may be configured to be driven by the driving power.

In one implementation, the control unit of the surge protection circuit may include an Intelligent Power Module (IPM) configured to apply the driving power to the at least one motor according to the operation mode, and a sixth capacitor connected to the IPM and a power line of the at least one motor.

In one implementation, the sixth capacitor of the surge protection circuit may be a capacitor performing bootstrapping for driving the at least one motor.

In one implementation, the operation mode of the surge protection circuit may be one of water supply, washing, and draining modes.

In one implementation, the IPM of the surge protection circuit may be configured to apply the driving power to the at least one motor, in response to the one of the water supply, washing, and draining modes.

In one implementation, the motor unit of the surge protection circuit may include a first motor and a second motor. The IPM may be configured to apply the driving power to the first motor or the second motor, in response to one of the water supply, washing, and draining modes.

In one implementation, the at least one motor may be a three-phase motor, and the rectification unit may be provided with a bridge diode.

In accordance with one implementation of the present disclosure, there is provided a dishwasher including a surge protection circuit. The surge protection circuit of the dishwasher may include a power supply unit to which first power is applied, a filter unit configured to filter noise of the first power while a current corresponding to the surge flows therethrough, a motor unit provided with at least one motor controlled by a control unit according to an operation mode, and a rectification unit provided with at least one protection capacitor, and configured to rectify the first power into second power. The filter unit may be connected with a ground so that the current is applied to the filter unit through the ground. A first impedance may be generated by the filter unit and the rectification unit and a second impedance may be generated by the control unit and the motor unit, in a manner that a value of the first impedance is smaller than a value of the second impedance.

In one implementation, the first power of the dishwasher may be alternating current (AC) power applied through a live terminal and a neutral terminal the filter unit may be provided with a first capacitor and a second capacitor connected between the live terminal and the neutral terminal. The rectification unit may be provided with a third capacitor, a fourth capacitor, and a fifth capacitor connected between the live terminal and the neutral terminal. The current corresponding to the surge may flow along a path configured by the ground and the first to fifth capacitors.

In one implementation, the ground of the dishwasher may be connected to a node between the first capacitor and the second capacitor.

In one implementation, the control unit of the dishwasher may be configured to generate driving power using the second power according to the operation mode, and the motor unit may be configured to be driven by the driving power.

In one implementation, the control unit of the dishwasher may include an Intelligent Power Module (IPM) configured to apply the driving power to the at least one motor according to the operation mode, and a sixth capacitor connected to the IPM and a power line of the at least one motor.

In one implementation, the sixth capacitor may be a capacitor performing bootstrapping for driving the at least one motor.

In one implementation, the operation mode of the dishwasher may be one of water supply, washing, and draining modes.

In one implementation, the IPM of the dishwasher may be configured to apply the driving power to the at least one motor, in response to one of the water supply, washing, and draining modes.

In one implementation, the motor unit of the dishwasher may include a first motor and a second motor, and the IPM may be configured to apply the driving power to the first motor or the second motor, in response to one of the water supply, washing, and draining modes.

In one implementation, the at least one motor may be a three-phase motor, and the rectification unit may be provided with a bridge diode.

An implementation according to the present disclosure has an effect of protecting an electronic device from an external surge.

The implementation has an effect of designing a motor in a small volume.

The implementation also has an effect of producing a surge protection circuit at a low cost.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a surge protection circuit according to an embodiment will be described with reference to FIGS. 1 and 2.

Figure 1:
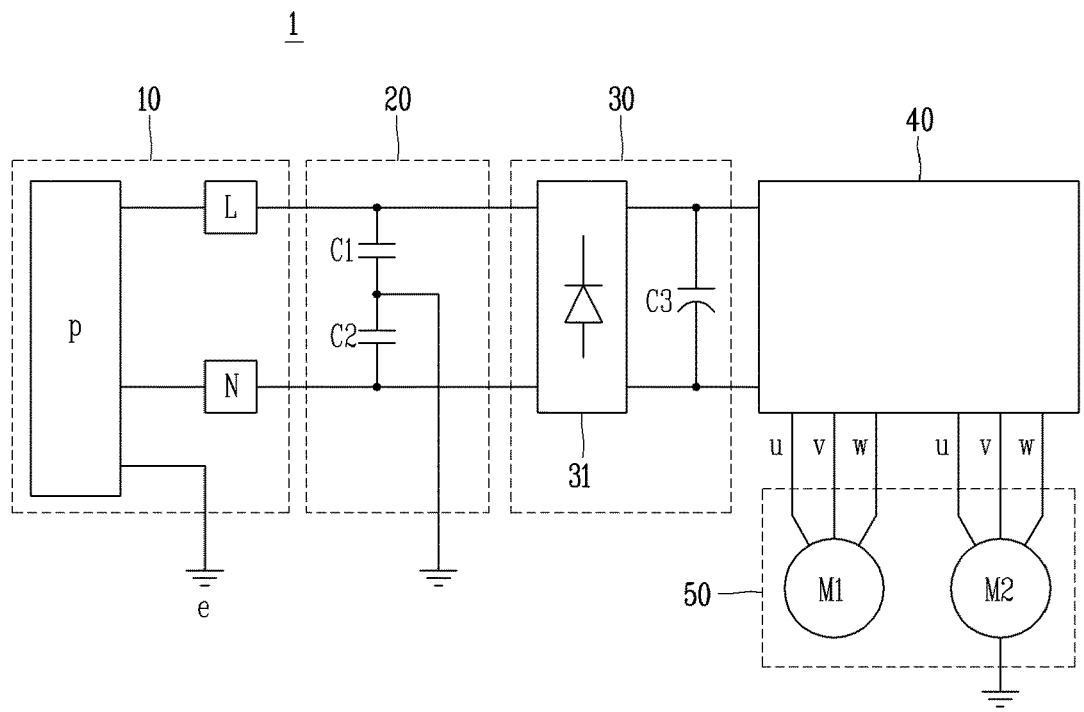
FIG. 1 is a diagram illustrating a part of a configuration of a dishwasher including a surge protection circuit in accordance with an embodiment.

FIG. 1 is a diagram illustrating a part of a configuration of a dishwasher including a surge protection circuit in accordance with an embodiment.

Referring to FIG. 1, a surge protection circuit 1 according to an embodiment includes a power supply unit 10, a filter unit 20, a rectification unit 30, a control unit 40, and a motor unit 50.

The power supply unit 10 supplies power required to operate a dishwasher from a commercial power source or an external power source. The power supply unit 10 may include a cord p through which alternating current (AC) power is received from the commercial power source, and a cord reel (not illustrated) on which the cord is wound.

Specifically, the power supply unit 10 may include a live terminal L and a neutral terminal N, so that commercial AC power can be applied from the power cord p to the live terminal L and the neutral terminal N.

The filter unit 20 includes a first capacitor C1 and a second capacitor C2 connected between the live terminal L and the neutral terminal N, and a ground e is connected to a node between the first capacitor C1 and the second capacitor C3 so that a surge is applied to the filter unit 20 through the ground e.

The filter unit 20 is configured to filter noise from commercial power of the power supply unit 10. Specifically, the filter unit 20 may be a Y capacitor implemented by the first capacitor C1 and the second capacitor C2, and the Y capacitor is a capacitor for shielding common mode (CM) noise.

Here, the common mode noise is noise that enters the surge protection circuit 1 through the ground e, and a detailed description of the Y capacitor is omitted.

The rectification unit 30 includes a diode part 31 and a third capacitor C3, and is configured to rectify AC power, from which noise has been removed, into direct current (DC) power.

The diode part 31 may be a bridge diode including a plurality of diodes, and the number of diodes included may be determined depending on the commercial power applied. For example, if the commercial AC power is single-phase AC power, four diodes may be configured in a bridge form. On the other hand, if the commercial AC power is three-phase AC power, six diodes may be configured in a bridge form. However, the embodiment of the present disclosure is not limited thereto.

The third capacitor C3 may be a constant voltage capacitor that is connected between the live terminal L and the neutral terminal N, and configured to suppress sudden voltage fluctuation, and remove a high frequency signal so as to maintain a constant voltage of DC power.

The control unit 40 is configured to control the motor unit 50 so that the dishwasher performs operations such as water supply, washing, and draining. The control unit 40 includes an IPM and a fourth capacitor C4 (see FIG. 2).

The IPM includes an internal logic circuit 41 and is configured to generate driving power, in response to an operation mode such as water supply to a first motor M1 and a second motor M2, washing, draining, or the like, and apply the generated driving power to the motor unit 50.

The internal logic circuit 41 is configured to control switching operations of switches (not illustrated), which are connected to the first motor M1 and the second motor M2, to drive the first motor M1 and the second motor M2 according to a signal from a Micom (not illustrated).

For convenience of explanation, the internal logic circuit 41 is described as controlling the switching operations of the switches connected to the first motor M1 and the second motor M2, but the embodiment is not limited thereto.

The fourth capacitor C4 may be connected between the internal logic circuit 41 and the motor unit 50. The fourth capacitor C4 may be a capacitor, namely, a bootstrap capacitor for a floating ground to allow bootstrapping to be applied to a gate capacitor (not illustrated) connected to a switch, for example, a gate of a transistor for driving the first motor M1 and the second motor M2.

Figure 2:
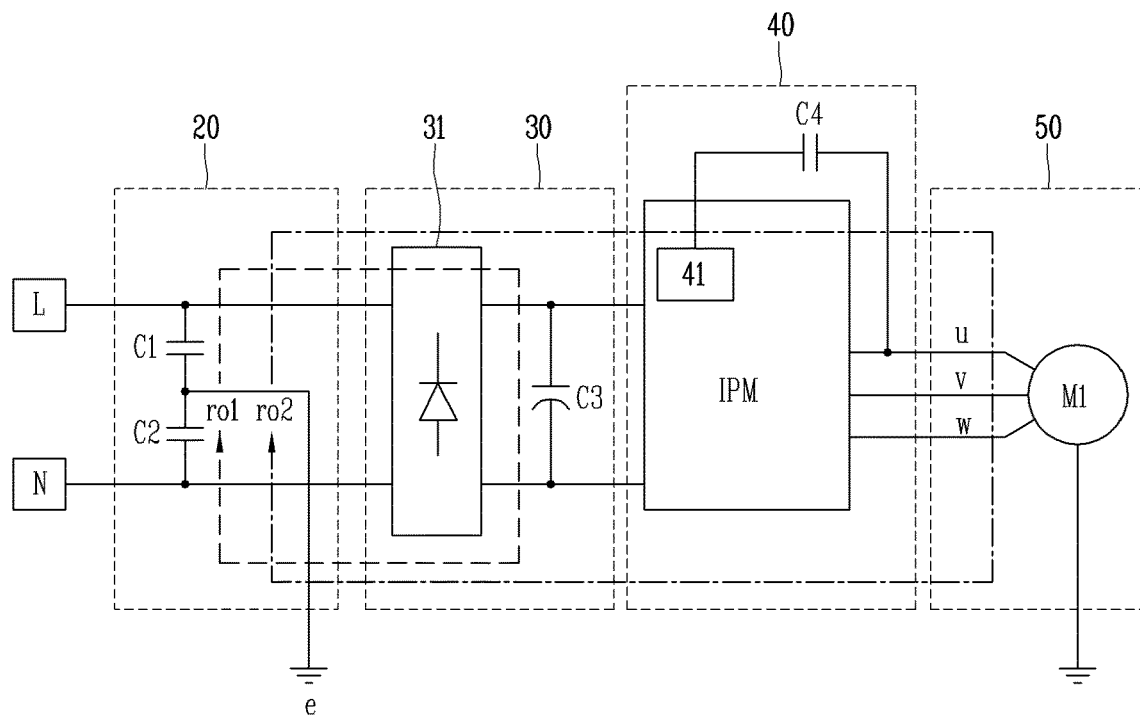
FIG. 2 is a diagram illustrating a surge path in case where a protection capacitor is not provided in accordance with an embodiment.

For convenience of description, FIG. 2 illustrates that the fourth capacitor is connected only to a first power line u among three-phase power lines, but the implementation is not limited thereto, and bootstrap capacitors may alternatively be connected to a second power line v and a third power line w, respectively.

The motor unit 50 includes a first motor M1 and a second motor M2, and the first motor M1 and the second motor M2 may be 3-phase motors.

Each of the first motor M1 and the second motor M2 includes a stator and a rotor. AC power of a phase corresponding to a predetermined frequency is applied to a coil of the stator corresponding to the phase. Accordingly, the rotor is rotated by those three-phase power u, v, and W applied to the respectively coils through the power lines.

Each of the first motor M1 and the second motor M2 may be, for example, a Surface-Mounted Permanent-Magnet Synchronous Motor (SMPMSM), an Interior Permanent Magnet Synchronous Motor (IPMSM), a Synchronous Reluctance Motor (Synrm), or the like, but the implementation is not limited thereto.

The first motor M1 and the second motor M2 are motors used for performing strokes, for example, water supply, washing, draining, and the like of the dishwasher, and may operate under the control of the control unit 40.

Hereinafter, a path of a common mode surge will be described with reference to FIG. 2.

FIG. 2 is a diagram illustrating a surge path in case where a protection capacitor is not provided in accordance with an embodiment.

Referring to FIG. 2, a common mode (CM) surge (hereinafter, referred to as a surge) is applied through the ground e of the filter unit 20. The surge may partially flow through a first path ro1 (hereinafter, referred to as a first surge), and the remaining of the surge may flow through a second path ro2 (hereinafter, referred to as a second surge). That is, the surge may be divided into the first surge and the second surge to correspond to a combined impedance (hereinafter, referred to as a first impedance) of the filter unit 20 and the rectification unit 30, and a combined impedance (hereinafter, referred to as a second impedance) of the control unit 40 and the motor unit 50.

The second surge may cause the first motor M1 and the IPM to be burnt. In order to prevent such burnout of the motor unit 50 and the IPM due to the second surge, at least one capacitor may be further provided on the first path ro1 to reduce the second surge flowing to the control unit 40 and the motor unit 50. That is, by further providing at least one protection capacitor on the first path ro1, an impedance value of the first impedance can be lowered so that a surge current flows only in the first path ro1.

Hereinafter, a rectification unit including a protection capacitor I according to an implementation will be described with reference to FIG. 3.

Figure 3:
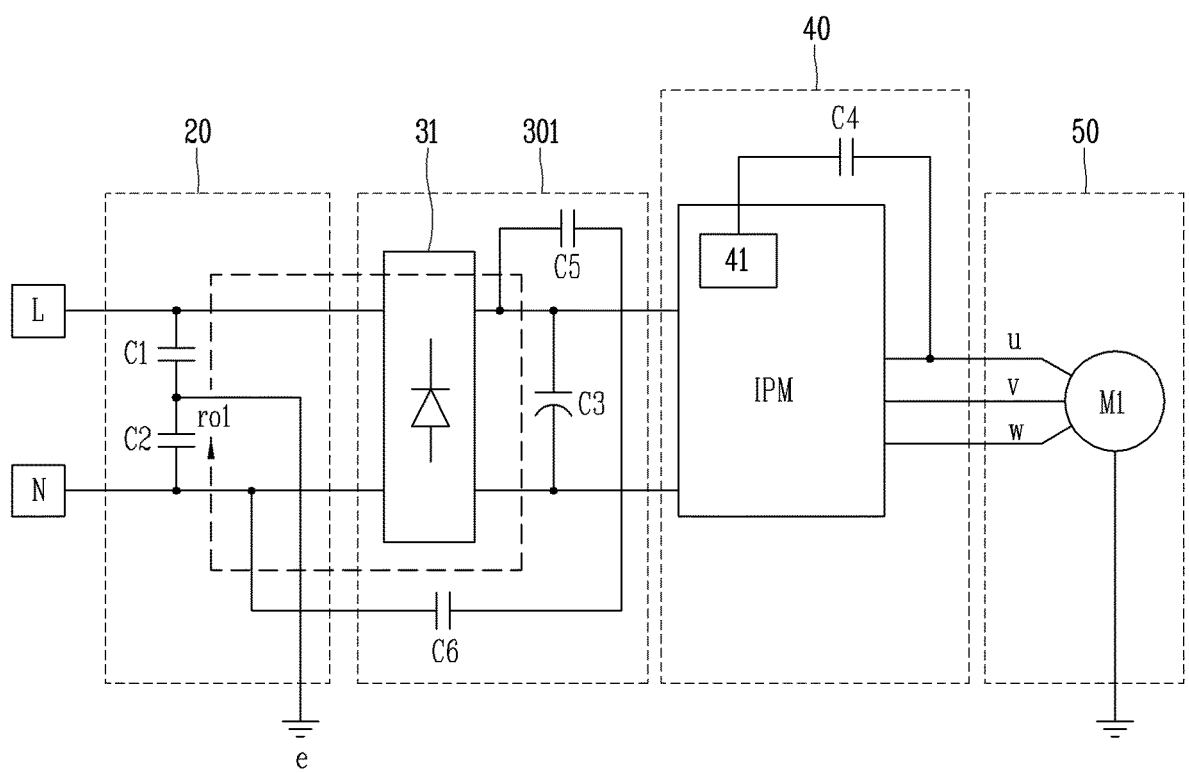
FIG. 3 is a diagram illustrating a surge path in case where a protection capacitor is provided in accordance with an embodiment.

FIG. 3 is a diagram illustrating a surge path in case where a protection capacitor is provided in accordance with an embodiment.

Referring to FIG. 3, a rectification unit 301 according to an implementation includes a first protection capacitor C5 and a second protection capacitor C6 connected between the live terminal L and the neutral terminal N. The first protection capacitor C5 and the second protection capacitor C6 are configured such that a value of the first impedance is smaller than a value of the second impedance, and are connected to each other in series on the first path ro1.

Specifically, one end of the first protection capacitor C5 is connected to the live terminal L and another end of the first capacitor C5 is connected to one end of the second protection capacitor C6. Further, another end of the second protection capacitor C6 is connected to the neutral terminal N.

Here, the first protection capacitor C5 and the second protection capacitor C6 may be designed such that a value of the first impedance including a combined capacitance reactance value of the first protection capacitor C5 and the second protection capacitor C6 can be ignored compared to a value of the second impedance. That is, the capacitances of the first protection capacitor C5 and the second protection capacitor C6 may be designed such that the value of the first impedance is much smaller than the value of the second impedance.

Therefore, as illustrated in FIG. 3, the surge flows only in the first path ro1. That is, since a surge current having an impedance in which harmonic noise due to a surge is relatively low is discharged through the first path ro1. This may result in improving surge immunity of the control unit 40 and the motor unit 50.

Accordingly, since no surge flows through the second path ro2 including the first motor M1 and the second motor M2, inner spaces of the first motor M1 and the second motor M2 can be designed to be smaller than or equal to a reference inner space (e.g., 3 mm).

For convenience of explanation, FIGS. 2 and 3 illustrate only the first motor M1 in the motor unit 50, but the implementation is not limited thereto. The second motor M2 may be connected to the ground e.

In addition, although the power supply unit 10, the filter unit 20, and the rectification unit 30 have been described as separate configurations, the implementation is not limited thereto. The power supply unit 10, the filter unit 20, and the rectification unit 30 may alternatively be included in one configuration.

As described above, the surge protection circuit 1 according to the implementation includes the first protection capacitor C5 and the second protection capacitor C6 which are provided in the rectification unit 301 and connected to each other in a manner that the first impedance value is smaller than the second impedance value. That is, since a surge current having an impedance in which harmonic noise due to a surge is relatively low is discharged through the first path ro1, by virtue of the first protection capacitor C5 and the second protection capacitor C6. This may result in improving surge immunity of the control unit 40 and the motor unit 50.

Therefore, compared to the related art in which a circuit has been further provided in a motor drive circuit for surge protection, the surge protection circuit 1 according to the implementation which is equipped with only two capacitors can reduce a manufacturing cost of a product, and the inner spaces of the first motor M1 and the second motor M2 can be designed to be 3 mm or less, thereby reducing a volume of the surge protection circuit.

Although the implementations of the present disclosure have been described in detail above, the scope of the present disclosure is not limited thereto, and various modifications and improvements made by those skilled in the art using the basic concept of the present disclosure defined in the following claims of the present disclosure will also belong to the claims of the present disclosure. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A surge protection circuit, comprising:
   a power supply unit configured to supply first power;
   a filter unit configured to filter noise of the first power while a current corresponding to a surge flows through the filter unit;
   a motor unit provided with at least one motor;
   a control unit configured to control the motor unit according to an operation mode; and
   a rectification unit provided with at least one protection capacitor and configured to rectify the filtered first power into second power,
   wherein the filter unit is connected with a ground to thereby apply the current to the filter unit through the ground,
   wherein a first impedance is generated by the filter unit and the rectification unit and a second impedance is generated by the control unit and the motor unit, and
   wherein a value of the first impedance is less than a value of the second impedance.

2. The surge protection circuit of claim 1, wherein the first power is alternating current (AC) power applied through a live terminal and a neutral terminal,
   wherein the filter unit is provided with a first capacitor and a second capacitor connected between the live terminal and the neutral terminal,
   wherein the rectification unit is provided with a third capacitor, a fourth capacitor, and a fifth capacitor connected between the live terminal and the neutral terminal, and
   wherein the current corresponding to the surge flows along a path configured by the ground and the first through fifth capacitors.

3. The surge protection circuit of claim 2, wherein the ground is connected to a node between the first capacitor and the second capacitor.

4. The surge protection circuit of claim 3, wherein the control unit is configured to generate driving power using the second power according to the operation mode, and
   wherein the motor unit is configured to be driven by the driving power.

5. The surge protection circuit of claim 4, wherein the control unit comprises:
   an Intelligent Power Module (IPM) configured to apply the driving power to the at least one motor according to the operation mode; and
   a sixth capacitor connected to the IPM and a power line of the at least one motor.

6. The surge protection circuit of claim 5, wherein the sixth capacitor is a capacitor configured to perform bootstrapping for driving the at least one motor.

7. The surge protection circuit of claim 6, wherein the operation mode comprises one of a water supply mode, a washing mode, or a draining mode.

8. The surge protection circuit of claim 7, wherein the IPM is configured to apply the driving power to the at least one motor in response to one of the water supply, washing, or draining modes.

9. The surge protection circuit of claim 8, wherein the motor unit comprises a first motor and a second motor, and
wherein the IPM is configured to apply the driving power to the first motor or the second motor in response to one of the water supply, washing, or draining modes.

10. The surge protection circuit of claim 1, wherein the at least one motor is a three-phase motor, and
wherein the rectification unit is provided with a bridge diode.

11. A dishwasher comprising a surge protection circuit, wherein the surge protection circuit comprises:
a power supply unit configured to supply first power;
a filter unit configured to filter noise of the first power while a current corresponding to a surge flows through the filter unit;
a motor unit provided with at least one motor;
a control unit configured to control the motor unit according to an operation mode; and
a rectification unit provided with at least one protection capacitor and configured to rectify the filtered first power into second power,
wherein the filter unit is connected with a ground to thereby apply the current to the filter unit through the ground,
wherein a first impedance is generated by the filter unit and the rectification unit and a second impedance is generated by the control unit and the motor unit, and
wherein a value of the first impedance is less than a value of the second impedance.

12. The dishwasher of claim 11, wherein the first power is alternating current (AC) power applied through a live terminal and a neutral terminal,
wherein the filter unit is provided with a first capacitor and a second capacitor connected between the live terminal and the neutral terminal,
wherein the rectification unit is provided with a third capacitor, a fourth capacitor, and a fifth capacitor connected between the live terminal and the neutral terminal, and
wherein the current corresponding to the surge flows along a path configured by the ground and the first to fifth capacitors.

13. The dishwasher of claim 12, wherein the ground is connected to a node between the first capacitor and the second capacitor.

14. The dishwasher of claim 13, wherein the control unit is configured to generate driving power using the second power according to the operation mode, and
wherein the motor unit is configured to be driven by the driving power.

15. The dishwasher of claim 14, wherein the control unit comprises:
an Intelligent Power Module (IPM) configured to apply the driving power to the at least one motor according to the operation mode; and
a sixth capacitor connected to the IPM and a power line of the at least one motor.

16. The dishwasher of claim 15, wherein the sixth capacitor is a capacitor configured to perform bootstrapping for driving the at least one motor.

17. The dishwasher of claim 16, wherein the operation mode comprises one of a water supply mode, a washing mode, or a draining mode.

18. The dishwasher of claim 17, wherein the IPM is configured to apply the driving power to the at least one motor in response to one of the water supply, washing, or draining modes.

19. The dishwasher of claim 18, wherein the motor unit comprises a first motor and a second motor, and
wherein the IPM is configured to apply the driving power to the first motor or the second motor in response to one of the water supply, washing, or draining modes.

20. The dishwasher of claim 11, wherein the at least one motor is a three-phase motor, and
wherein the rectification unit is provided with a bridge diode.

* * * * *